(12) United States Patent
Cai

(10) Patent No.: US 12,043,156 B2
(45) Date of Patent: Jul. 23, 2024

(54) BARRIER-FREE AUXILIARY RIDING DEVICE

(71) Applicant: NextGen Exchange Group Inc., Grand Cayman (KY)

(72) Inventor: Dinglian Cai, Zhangzhou (CN)

(73) Assignee: NEXTGEN EXCHANGE GROUP INC., Grand Cayman (KY)

( * ) Notice: Subject to any disclaimer, the term of this patent is extended or adjusted under 35 U.S.C. 154(b) by 38 days.

(21) Appl. No.: 17/898,114

(22) Filed: Aug. 29, 2022

(65) Prior Publication Data

US 2024/0067072 A1    Feb. 29, 2024

(51) Int. Cl.
*B60N 3/02* (2006.01)
*B60N 2/005* (2006.01)
*B60N 2/64* (2006.01)

(52) U.S. Cl.
CPC .............. *B60N 3/026* (2013.01); *B60N 2/005* (2013.01); *B60N 2/64* (2013.01)

(58) Field of Classification Search
CPC .......... B60N 3/026; B60N 2/005; B60N 2/64; B61D 49/00; B62N 2/245
See application file for complete search history.

(56) References Cited

U.S. PATENT DOCUMENTS

| | | | |
|---|---|---|---|
| 10,960,805 B2 * | 3/2021 | Nagai | B60N 2/938 |
| 2021/0009021 A1 * | 1/2021 | Nakai | B60N 3/02 |

FOREIGN PATENT DOCUMENTS

| | | | | |
|---|---|---|---|---|
| CN | 108790989 A | * | 11/2018 | |
| CN | 111823971 A | * | 10/2020 | ............... B60N 2/30 |
| CN | 114572082 A | * | 6/2022 | |
| DE | 102005009119 A1 | * | 9/2006 | ............. B60N 2/242 |
| DE | 102005009119 B4 | * | 7/2011 | ............. B60N 2/242 |
| EP | 3375660 A1 | * | 9/2018 | ............. B60N 2/005 |
| JP | 2020044964 A | * | 3/2020 | ............... B60N 2/22 |

* cited by examiner

*Primary Examiner* — Karen Beck
(74) *Attorney, Agent, or Firm* — Messner Reeves LLP

(57) ABSTRACT

This application discloses a barrier-free auxiliary riding device including a supporting frame rod disposed in a vacant area, a backrest assembly and a handrail assembly. The supporting frame rod is fixedly disposed in a carriage located on one side of the vacant area, the backrest assembly is disposed on the supporting frame rod, the handrail assembly includes a mounting base and a guard bar. According to this application, the position, directly facing the passenger get-off door, of the carriage is set as the vacant area to facilitate the riding of disabled passengers, meanwhile, the handrail assembly is disposed in the vacant area to protect the disabled passengers, and the backrest assembly is disposed for the disabled passengers to lean against, so that the riding safety of the disabled passengers is guaranteed.

7 Claims, 4 Drawing Sheets

BARRIER-FREE AUXILIARY RIDING DEVICE

TECHNICAL FIELD

This application relates to the technical field of vehicle accessories, in particular, to a barrier-free auxiliary riding device.

BACKGROUND

An existing vehicle, such as a passenger car and a bus, is equipped with multiple rows of passenger seats in a carriage, and an area directly facing a passenger getting-off door is also equipped with a row of middle seats. As a result, the space between the passenger getting-off door and the middle seats is very narrow, which brings great inconvenience to disabled passengers in wheelchairs. At present, although some vehicles have wheelchair areas in areas directly facing passenger getting-off doors, disabled passengers in wheelchairs are not well protected in the wheelchair areas. In addition, disabled passengers can only lean against side walls of the carriages in the wheelchair areas and are prone to collision with the carriages due to bumpiness of the vehicles. Thus, the safety of disabled passengers cannot be guaranteed.

SUMMARY

This application is to provide a barrier-free auxiliary riding device, which can not only facilitate the riding of disabled passengers, but also guarantee the riding safety of the disabled passengers.

This application adopts the following technical solution:

A barrier-free auxiliary riding device, including a supporting frame rod disposed in a vacant area, a backrest assembly and a handrail assembly, where the position, directly facing a passenger get-off door, of a carriage is set as the vacant area, the supporting frame rod is fixedly disposed in the carriage located on one side of the vacant area, the backrest assembly is disposed on the supporting frame rod, the handrail assembly includes a mounting base and a guard bar, the mounting base is fixedly disposed on the supporting frame rod and located on one side, close to the passenger getting-off door, of the backrest assembly, and the guard bar is rotatably disposed in the mounting base and can rotate from an outer side of the vacant area into the vacant area.

Preferably, the supporting frame rod includes a vertical frame rod and a longitudinal frame rod, the vertical frame rod is disposed between a bottom surface and a top surface of the carriage, and the longitudinal frame rod is disposed between the vertical frame rod and one side of the carriage.

Preferably, the backrest assembly includes a vertical mounting rod and a back cushion, the vertical mounting rod is L-shaped, with both ends fixedly disposed in the longitudinal frame rod, and the back cushion is fixedly disposed onto the vertical mounting rod and has a backward inclination angle.

Preferably, the handrail assembly further includes a connecting socket fixedly disposed in the mounting base, an upper part of the connecting socket is provided with a first plug-in part, and the first plug-in part is provided with a positioning part; the guard bar includes an upper bar body, a plug connector, a lower bar body and a connecting rod; the plug connector is fixedly disposed at one end of the upper bar body, rotatably inserted in the first plug-in part, and positioned by the positioning part, one end of the lower bar body is detachably and fixedly disposed in the connecting socket, and the connecting rod is fixedly disposed between the upper bar body and the lower bar body.

Preferably, the connecting socket has a hollow tubular structure, the first plug-in part and the positioning part are concentrically ring-shaped, and at least two positioning openings are disposed along a circumferential direction of the positioning part; the plug connector includes a connecting part, a second plug-in part and a positioning block, the connecting part is fixedly connected to the upper bar body and extends downward to form the second plug-in part and the positioning block, and the positioning block is located at an outer side of the second plug-in part and engaged with one of the positioning openings.

Preferably, the positioning openings are V-shaped, the positioning block has a shape adapted to the shape of the positioning openings, the number of the positioning openings is two, and the two positioning openings are distributed at 90°.

Preferably, the mounting base includes a first pipe body and a second pipe body fixedly connected together, the first pipe body is fixedly locked onto the supporting frame rod by screws, the second pipe body is fixedly locked onto the connecting socket by screws, and the lower bar body is fixedly locked onto the connecting socket by screws.

Preferably, the barrier-free auxiliary riding device further includes side seats, where a plurality of side seats are disposed on a side wall of the vacant area of the carriage, and the side seats can be folded to abut against the side wall of the carriage.

Preferably, the side seats each include a lower fixing base, an upper fixing base, a first connector, a seat plate, a second connector and a third connector, the lower fixing base and the upper fixing base are fixed onto the side wall of the carriage side by side, one end of the first connector is hinged with the lower fixing base, the other end is hinged with the seat plate, one end of the second connector is hinged with the upper fixing base, the other end is hinged with one end of the third connector, and the other end of the third connector is hinged with the first connector.

This application has the following advantages compared with the BACKGROUND:

1. According to an embodiment of this application, the position, directly facing the passenger get-off door, of the carriage is set as the vacant area to facilitate the riding of disabled passengers, meanwhile, the handrail assembly is disposed in the vacant area to protect the disabled passengers, and the backrest assembly is disposed for the disabled passengers to lean against, so that the riding safety of the disabled passengers is guaranteed.
2. According to an embodiment of this application, the guard bar can rotate relative to the mounting base from an outer side of the vacant area into the vacant area, so that the guard bar can be unfolded to protect disabled passengers in wheelchairs, and can also be folded when not in use, thereby increasing standing area for passengers and avoiding the waste of carriage space.
3. According to an embodiment of this application, a plurality of side seats are disposed on a side wall of the vacant area of the carriage, and the side seats can be folded to abut against the side wall of the carriage for the convenience of disabled passengers in wheelchairs. The side seats can be normally used by passengers when there are no disabled passengers, thereby further avoiding the waste of carriage space.

Figure 1:
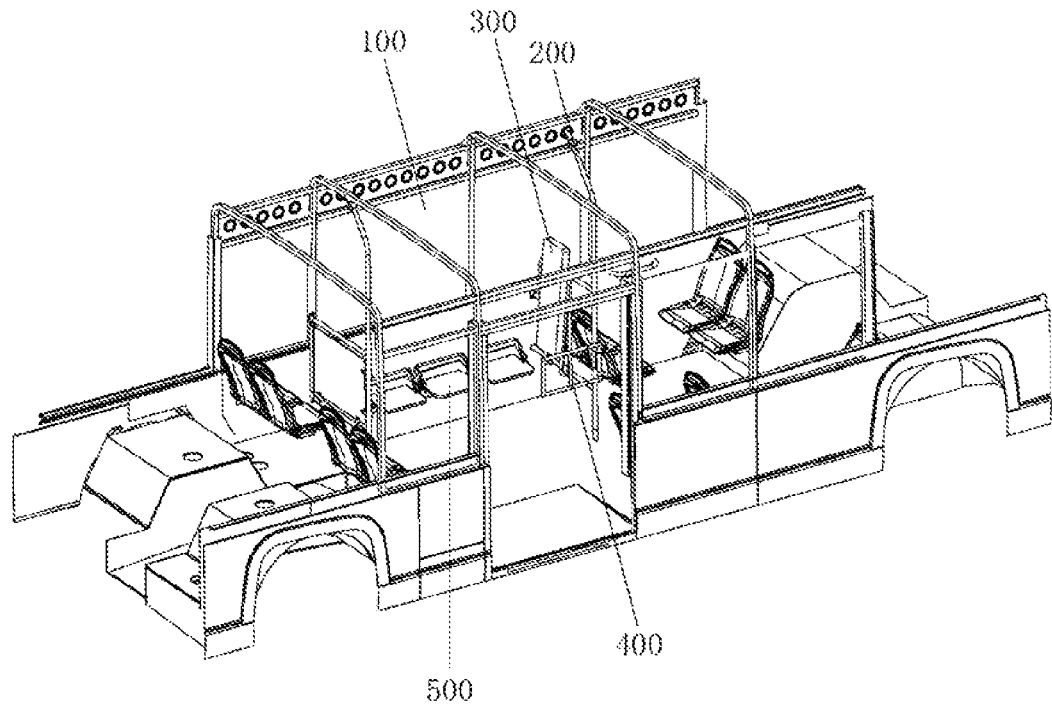
FIG. 1 is a three-dimensional schematic diagram I according to this application.

DESCRIPTION OF REFERENCE NUMERALS IN THE DRAWINGS carriage 100;

supporting frame rod 200, vertical frame rod 210, longitudinal frame rod 220;

backrest assembly 300, vertical mounting rod 310, back cushion 320;

handrail assembly 400, mounting base 410, first pipe body 411, second pipe body 412, guard bar 420, upper bar body 421, plug connector 422, connecting part 4221, second plug-in part 4222, positioning block 4223, lower bar body 423, connecting rod 424, connecting socket 430, first plug-in part 431, positioning part 432, positioning openings 433;

side seats 500, lower fixing base 510, upper fixing base 520, first connector 530, seat plate 540, second connector 550 and third connector 560.

DESCRIPTION OF EMBODIMENTS

To make the objectives, technical solutions, and advantages of this application clearer, this application will be further described in detail with reference to the accompanying drawings and embodiments. It should be understood that specific embodiments described herein are merely intended to explain this application, but not intended to limit this application.

It should be explained in this application that the terms "up", "down", "left", "right", "vertical", "horizontal", "inner", "outer" and the like show an orientation or positional relationship shown based on the accompanying drawings, are intended only to facilitate the description of this application and simplification of the description rather than indicating or implying that a device or element according to this application must have a specific orientation, and therefore should not be construed as a limitation to this application.

Embodiment

Figure 2:
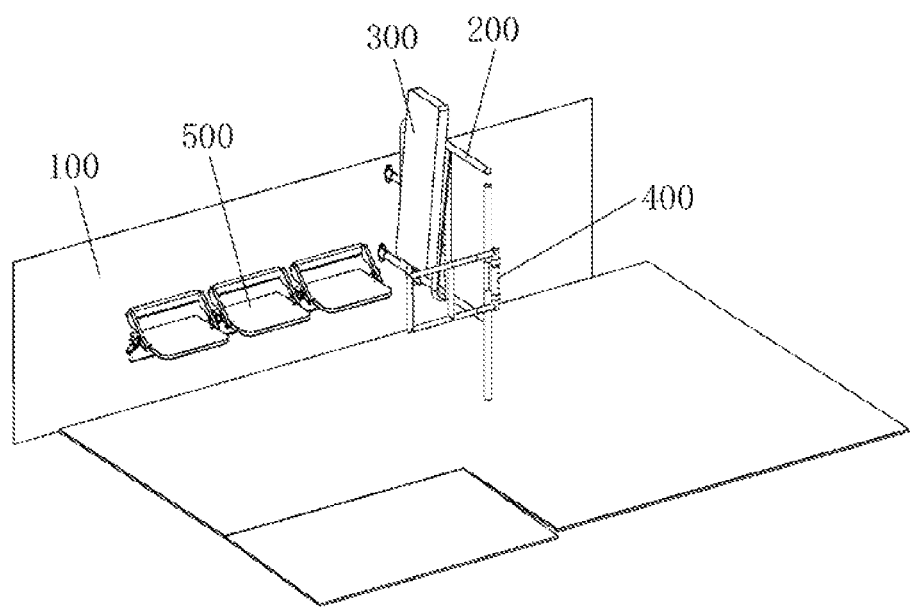
FIG. 2 is a three-dimensional schematic diagram II according to this application.

As shown in FIG. 1 and FIG. 2, this application discloses a barrier-free auxiliary riding device, in which the position, directly facing a passenger get-off door, of a carriage 100 is set as a vacant area. The barrier-free auxiliary riding device includes a supporting frame rod 200 disposed in the vacant area, a backrest assembly 300, a handrail assembly 400 and side seats 500.

Figure 3:
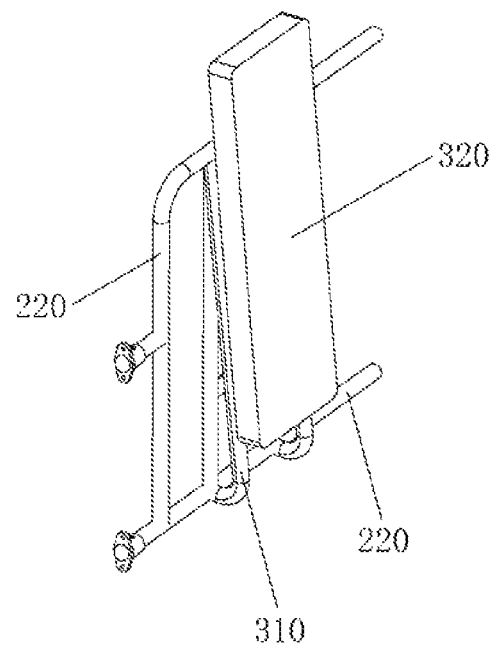
FIG. 3 is a schematic installation diagram of a backrest assembly.
Figure 4:
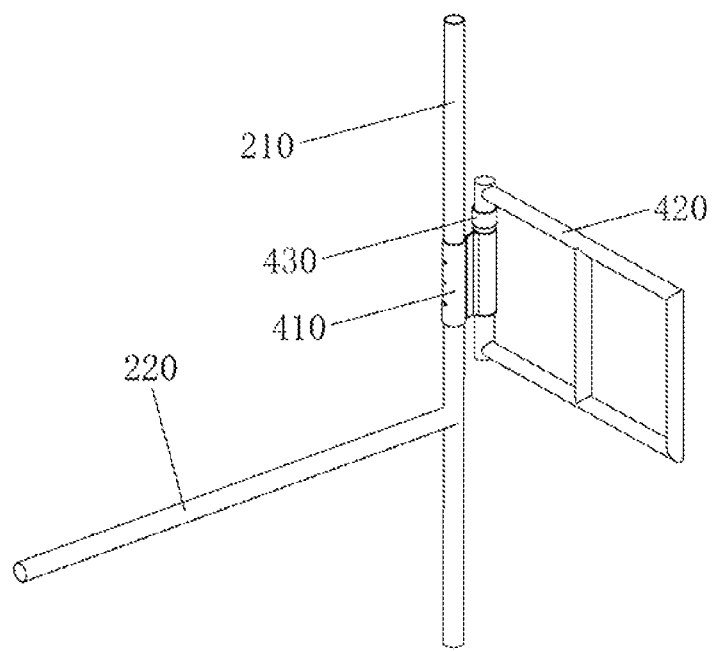
FIG. 4 is a schematic installation diagram of a handrail assembly.
Figure 5:
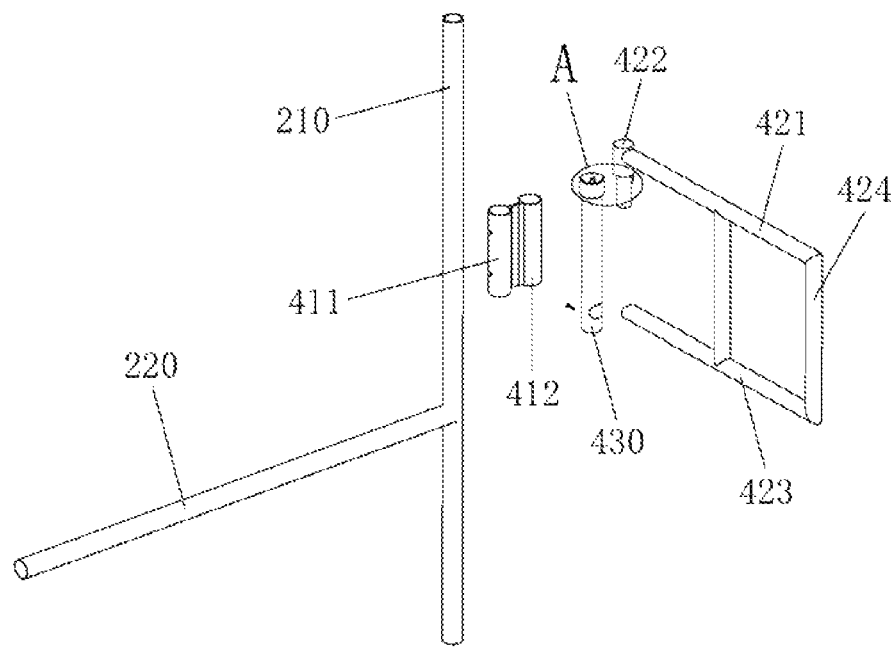
FIG. 5 is a schematic exploded view of a handrail assembly.
Figure 6:
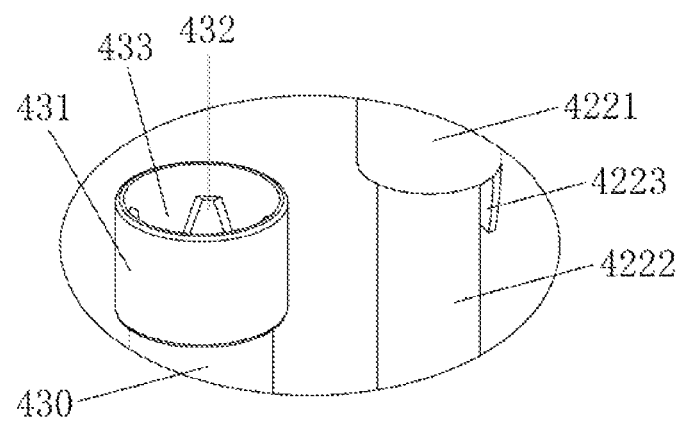
FIG. 6 is a partial enlarged view at A in FIG. 5.

As shown in FIG. 2, FIG. 3, and FIG. 4, the supporting frame rod 200 is fixedly disposed in the carriage 100 located on one side of the vacant area, the supporting frame rod 200 includes a vertical frame rod 210 and a longitudinal frame rod 220, the vertical frame rod 210 is disposed between a bottom surface and a top surface of the carriage 100, and the longitudinal frame rod 220 is disposed between the vertical frame rod 210 and one side of the carriage 100.

The backrest assembly 300 is disposed on the supporting frame rod 200 and includes a vertical mounting rod 310 and a back cushion 320, the vertical mounting rod 310 is L-shaped, with both ends fixedly disposed in the longitudinal frame rod 2240, and the back cushion 320 is fixedly disposed onto the vertical mounting rod 310 and has a backward inclination angle, so that the center of gravity of passengers is backward when leaning, ensuring more stable leaning.

As shown in FIG. 2, FIG. 4, FIG. 5, and FIG. 6, the handrail assembly 400 includes a mounting base 410 and a guard bar 420, the mounting base 410 is fixedly disposed on the supporting frame rod 200 and located on one side, close to the passenger getting-off door, of the backrest assembly 300, and the guard bar 420 is rotatably disposed in the mounting base 410 and can rotate from an outer side of the vacant area into the vacant area. The mounting base 410 includes a first pipe body 411 and a second pipe body 412 fixedly connected together, the first pipe body 411 is fixedly locked onto the supporting frame rod 200 by screws, and the second pipe body 412 is fixedly locked onto the connecting socket 430 by screws.

The handrail assembly 400 further includes a connecting socket 430 fixedly disposed in the mounting base 410, an upper part of the connecting socket 430 is provided with a first plug-in part 431, and the first plug-in part 431 is provided with a positioning part 432; the guard bar 420 includes an upper bar body 421, a plug connector 422, a lower bar body 423 and a connecting rod 424; the plug connector 422 is fixedly disposed at one end of the upper bar body 421, rotatably inserted in the first plug-in part 431, and positioned by the positioning part 432, one end of the lower bar body 423 is detachably and fixedly disposed in the connecting socket 430, in this embodiment, the lower bar body 423 is fixedly locked onto the connecting socket 430 by screws, and the connecting rod 424 is fixedly disposed between the upper bar body 421 and the lower bar body 423.

The connecting socket 430 has a hollow tubular structure, the first plug-in part 431 and the positioning part 432 are concentrically ring-shaped, and at least two positioning openings 433 are disposed along a circumferential direction of the positioning part 432; the plug connector 422 includes a connecting part 4221, a second plug-in part 4222 and a positioning block 4223, the connecting part 4221 is fixedly connected to the upper bar body 421 and extends downward to form the second plug-in part 4222 and the positioning block 4223, and the positioning block 4223 is located at an outer side of the second plug-in part 4222 and engaged with one of the positioning openings 433. In this embodiment, the positioning openings 433 are V-shaped, the positioning block 4223 has a shape adapted to the shape of the positioning openings 433, the number of the positioning openings 433 is two, and the two positioning openings 433 are distributed at 90°.

After the second plug-in part 4222 is inserted into the connecting socket 430, the positioning block 4223 is engaged with one of the positioning openings 433, and then the lower bar body 423 is fixedly locked onto the connecting socket 430 by screws. To adjust the guard bar 420, the screws that are used to fixedly lock the lower bar body 423 are loosened, and the guard bar 420 is moved up relative to the first plug-in part 431 to allow the positioning block 4223 to be separated from one positioning opening 433, then the guard bar 420 is rotated to another angle and moved down to allow the positioning block 4223 to be engaged with the other positioning opening 433, and then the lower bar body 423 is fixedly locked onto the connecting socket 430 by screws.

According to this application, when the guard bar 420 plays a protective effect, the positioning block 4223 is engaged with one of the positioning openings 433, and the guard bar 420 is used in an unfolded state, and cannot rotate under the restriction of the positioning block 4223 and the positioning openings 433. To fold the guard bar 420, the guard bar 420 is rotated to allow the positioning block 4223 to be engaged with the other positioning opening 433 to complete the folding of the guard bar 420.

Figure 7:
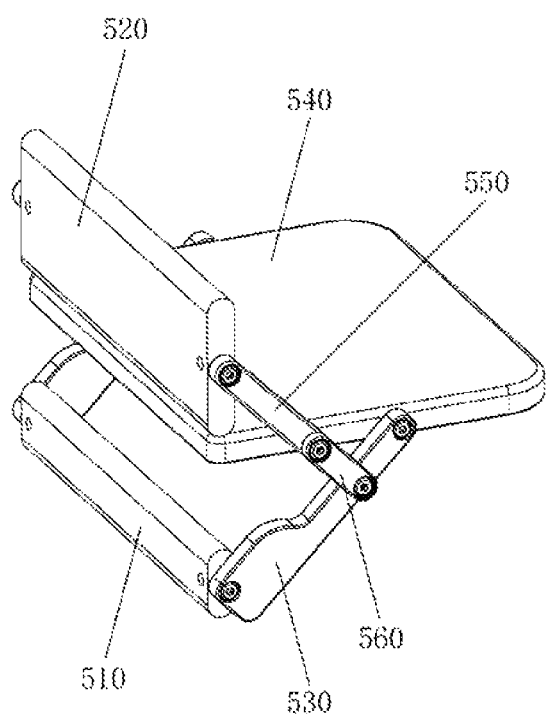
FIG. 7 is a three-dimensional schematic diagram of side seats.

As shown in FIG. 2 and FIG. 7, a plurality of side seats 500 are disposed on a side wall of the vacant area of the carriage 100, and the side seats 500 can be folded to abut against the side wall of the carriage 100. The side seats 500 each include a lower fixing base 510, an upper fixing base 520, a first connector 530, a seat plate 540, a second connector 550 and a third connector 560, the lower fixing base 510 and the upper fixing base 520 are fixed onto the side wall of the carriage 100 side by side, one end of the first connector 530 is hinged with the lower fixing base 510, the other end is hinged with the seat plate 540, one end of the second connector 550 is hinged with the upper fixing base 520, the other end is hinged with one end of the third connector 560, and the other end of the third connector 560 is hinged with the first connector 530.

When the side seats 500 are unfolded, the seat plate 540 is supported by the first connector 530, the second connector 550 and the third connector 560 for use by passengers to avoid the waste of carriage space. When the seat plate 540 is pulled upward, the first connector 530, the second connector 550 and the third connector 560 are folded towards the side wall of the carriage, so that the seat plate 540 abuts against the side wall of the carriage. The folded side seats 500 will not affect disabled passengers in wheelchairs.

The foregoing descriptions are merely preferred specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subjected to the protection scope of the claims.

What is claimed is:

1. A barrier-free auxiliary riding device, comprising a supporting frame rod disposed in a vacant area, a backrest assembly and a handrail assembly, wherein the position, directly facing a passenger get-off door, of a carriage is set as the vacant area, the supporting frame rod is fixedly disposed in the carriage located on one side of the vacant area, the backrest assembly is disposed on the supporting frame rod, the handrail assembly comprises a mounting base and a guard bar, the mounting base is fixedly disposed on the supporting frame rod and located on one side, close to the passenger getting-off door, of the backrest assembly, and the guard bar is rotatably disposed in the mounting base and can rotate from an outer side of the vacant area into the vacant area, wherein a plurality of side seats are disposed on a side wall of the vacant area of the carriage, and the side seats can be folded to abut against the side wall of the carriage, wherein the side seats each comprise a lower fixing base, an upper fixing base, a first connector, a seat plate, a second connector and a third connector, the lower fixing base and the upper fixing base are fixed onto the side wall of the carriage side by side, one end of the first connector is hinged with the lower fixing base, the other end is hinged with the seat plate, one end of the second connector is hinged with the upper fixing base, the other end is hinged with one end of the third connector, and the other end of the third connector is hinged with the first connector.

2. The barrier-free auxiliary riding device according to claim 1, wherein the supporting frame rod comprises a vertical frame rod and a longitudinal frame rod, the vertical frame rod is disposed between a bottom surface and a top surface of the carriage, and the longitudinal frame rod is disposed between the vertical frame rod and one side of the carriage.

3. The barrier-free auxiliary riding device according to claim 2, wherein the backrest assembly comprises a vertical mounting rod and a back cushion, the vertical mounting rod is L-shaped, with both ends fixedly disposed in the longitudinal frame rod, and the back cushion is fixedly disposed onto the vertical mounting rod and has a backward inclination angle.

4. The barrier-free auxiliary riding device according to claim 2, wherein the handrail assembly further comprises a connecting socket fixedly disposed in the mounting base, an upper part of the connecting socket is provided with a first plug-in part, and the first plug-in part is provided with a positioning part; the guard bar comprises an upper bar body, a plug connector, a lower bar body and a connecting rod; the plug connector is fixedly disposed at one end of the upper bar body, rotatably inserted in the first plug-in part, and positioned by the positioning part, one end of the lower bar body is detachably and fixedly disposed in the connecting socket, and the connecting rod is fixedly disposed between the upper bar body and the lower bar body.

5. The barrier-free auxiliary riding device according to claim 4, wherein the connecting socket has a hollow tubular structure, the first plug-in part and the positioning part are concentrically ring-shaped, and at least two positioning openings are disposed along a circumferential direction of the positioning part; the plug connector comprises a connecting part, a second plug-in part and a positioning block, the connecting part is fixedly connected to the upper bar body and extends downward to form the second plug-in part and the positioning block, and the positioning block is located at an outer side of the second plug-in part and engaged with one of the positioning openings.

6. The barrier-free auxiliary riding device according to claim 5, wherein the positioning openings are V-shaped, the positioning block has a shape adapted to the shape of the positioning openings, the number of the positioning openings is two, and the two positioning openings are distributed at 90°.

7. The barrier-free auxiliary riding device according to claim 4, wherein the mounting base comprises a first pipe body and a second pipe body fixedly connected together, the first pipe body is fixedly locked onto the supporting frame rod by screws, the second pipe body is fixedly locked onto the connecting socket by screws, and the lower bar body is fixedly locked onto the connecting socket by screws.

* * * * *